United States Patent Office
3,305,019
Patented Feb. 21, 1967

3,305,019
PROCESS FOR STIMULATING GAS WELLS
Melvin F. Katzer, Danville, Calif., assignor to The Dow Chemical Company, Midland, Mich., a corporation of Delaware
No Drawing. Filed Jan. 29, 1965, Ser. No. 429,164
8 Claims. (Cl. 166—45)

This invention concerns the chemical treatment of gas wells to stimulate and maintain gas production. More particularly it concerns the addition of a solid, water-soluble composition containing a high molecular weight, anionic acrylamide polymer to modify the well-bottom sand and thereby minimize its interference with the flow of gas from the well. This process is useful both to minimize the accumulation of sand in the well bottom and to reinitiate the flow of gas from a well blocked by accumulated sand.

Operating commercial gas wells normally coproduce with the gas from 2–50 barrels of water and from 5–40 barrels of sand per day. Much of this sand and water is carried to the surface by the gas flow. However, in both production and storage wells, the gradual accumulation of sand and water at the base of the well bore presents a major operating problem. Partial or even complete blocking of the well bore develops with concurrent loss in pressure at the well head and in gas flow. When production at an acceptable rate ceases because of sand accumulation and bridging in the well bore, mechanical reworking of the well is normally required to re-establish production. Reworking by swabbing, bailing, and other mechanical means, is a tedious and expensive operation with considerable danger of losing the reworking tools in the accumulated sand.

In U.S. Patent 3,073,387, Dunning e.a. describes a technique for reducing the accumulation of water by the addition of a foam producing detergent. Particularly convenient for field use is a solid detergent composition prepared in a cylindrical or stick form, as taught by Lissant in U.S. Patent 3,076,508. In addition to this "foaming stick" technique Lissant has suggested in U.S. Patent 2,748,867 a process for reactivating a drowned gas or oil well by using a reactive metal hydride encased in a water-soluble tube. When this "hydride stick" is dropped into a well, the water-soluble casing protects the hydride until the stick reaches the accumulated water. Then it dissolves and the hydride reacts releasing hydrogen to displace the water.

While these techniques counteract the accumulation of well-bottom water, they are ineffective in minimizing accumulation of well-bottom sand or restoring gas production once a well bore has been partially or completely blocked by sand bridging.

It has now been discovered that a water-soluble composition containing a high molecular weight, anionic acrylamide polymer added to the well bottom of a gas well modifies the well bottom sand so that interference with the gas flow is markedly reduced. Well-bottom sand recovered after this treatment is no longer self-adherent but is free-flowing and hence more readily swept out of the well bore by the gas flow.

In practice, a water-soluble composition containing up to 70 to 80 weight percent of the anionic acrylamide polymer formed as a solid unit with a water dispersible matrix or binder is employed for this treatment. Preferably the solid unit is in stick or pellet form in a size suitable for dropping down the well bore tube. Incorporation of a minor amount of a suitable detergent is often advantageous in dispersing the polymer at the well bottom. In a preferred embodiment, the solid composition consists essentially of (a) from 20 to 70 weight percent of a water-soluble, high molecular weight anionic acrylamide polymer, (b) from 2 to 10 weight percent of an alkyl benzene sulfonate, and (c) from 20 to 78 weight percent of a solid water-soluble polyoxyethylene glycol as the water-soluble matrix.

ANIONIC ACRYLAMIDE POLYMERS

An essential element in the new well treating composition is a water-soluble, high molecular weight anionic acrylamide polymer, (b) from 2 to 10 weight percent acrylamide or an acrylamide-acrylic acid copolymer. More specifically the suitable anionic acrylamide polymers are essential linear, water-soluble polymers comprising in major proportion a plurality of acrylamide and acrylic acid moieties of the formulas:

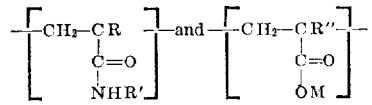

wherein R, R' and R" independently are H or $C_1$–$C_4$ alkyl groups, and M is H, $NH_4$, an alkali metal or a $C_1$–$C_4$ alkyl ammonium group, the mole ratio of said acrylamide to acrylic acid moieties ranging from 90/10 to 60/40. Furthermore minor amounts of up to about 30 mole percent of other suitable ethyleneically unsaturated monomers such as styrene, vinyl acetate, vinyl alkyl ether, maleic anhydride, allyl alcohol, styrene sulfonic acid, and 2-sodiosulfoethyl acrylate, can be incorporated in the polymer.

The term "anionic acrylamide polymer" as used herein thus encompasses water-soluble polymers containing at least 70 mole percent of the above acrylamide and acrylic acid moieties in the indicated mole ratio. Also the terms "an acrylamide," "an acrylic acid," and "an acrylamide-acrylic acid copolymer" are used generically to include the $C_1$–$C_4$ alkyl derivatives shown in the above formulas.

Particularly suitable anionic acrylamide polymers are water-soluble high molecular weight homopolymers of acrylamide with from 10–40 mole percent of the amide groups hydrolyzed to the corresponding carboxylic groups as described by Pye in Canadian Patents 522,850 and 522,851. Alternately, the anionic acrylamide polymers can be prepared by copolymerization of acrylamide and acrylic acid as described by Morgan in U.S. Patent 2,775,557. Furthermore acrylamide or methacrylamide can be copolymerized with an acrylic ester, nitrile or other derivative readily converted by hydrolysis to the desired acrylic acid moieties.

Suitable anionic acrylamide polymers should have a minimum molecular weight of 100 thousand and preferably from 1 to 10 million or more as determined by conventional viscosity measurements. Thus they have a minimum Ostwald viscosity of 4.0 centipoises at 20° C. when measured as a 0.5 weight percent solution at pH 3.0. Furthermore the polymer should be dispersible in water at a 0.5 weight percent concentration at room temperature to give a visually homogeneous and substantially transparent solution infinitely dilutable with water. Such solubility is generally characteristic of an essentially linear structure.

WATER-SOLUBLE MATRIX

To obtain a coherent composition which can be cast or shaped into the desired solid stick or pellet form, it is necessary to incorporate the water-soluble anionic acrylamide polymer in a water-soluble matrix.

Particularly suitable as a matrix are solid, water-soluble polyoxyalkylene polyols such as Carbowax and Polyox resins or polyoxyethylene glycols of the formula

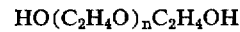

$HO(C_2H_4O)_nC_2H_4OH$

These materials can be heated to form a melt in which the finely divided anionic acrylamide polymer can be dispersed. The resulting composition can be formed into the desired shape by casting, molding, extrusion, or other conventional means.

Other suitable, commercially available, solid water-soluble binders include poly(vinyl alcohol), methyl cellulose, carboxymethyl cellulose, and various starches.

Another technique particularly effective when rapid response is desired is to freeze an aqueous solution of the anionic acrylamide polymers in a suitable mold and then drop the solid, frozen solution down the well bore. The frozen composition has adequate strength to minimize loss or hold up of the polymer as it drops down the well bore. At the bottom it soon melts to release the active polymer.

OTHER ADDITIVES

It is evident that other ingredients can be incorporated in small quantities in this well treating composition. Thus, it is often desirable to incorporate in the well treating composition an anionic or non-ionic detergent to assist in the solution and dispersion of the anionic acrylamide polymer at the well bottom. The particular anionic or non-ionic detergent is not critical except that it should be water-dispersible. Cationic detergents are in general unsatisfactory since they interfere with the functioning of the anionic acrylamide polymer.

Many suitable synthetic detergents are commercially known, cf. for example, J. W. McCutcheon, Inc., "Detergents and Emulsifiers—Up-To-Date" 1962. Particularly desirable are the sodium $C_8$–$C_{18}$ alkyl benzene sulfonates. However other anionic detergents, such as the fatty acid, sulfonate, sulfate, or phosphate detergents can also be used. Non-ionic detergents such as the polyalkyleneoxy glycol ethers, esters, and thiolesters or the polyethylene glycol addition products with fatty acid esters are also useful.

At times addition of a weighing agent, such as powdered lead, barium sulfate, or other dense finely divided solid may be desirable to increase the weight and density of the solid stick or pellets. Still other additives can be incorporated in minor amounts within the general scope of the present invention.

FLOCCULANT STICK

In practice the solid, water-soluble, well treating unit described herein is conveniently prepared by blending the anionic acrylamide polymer in finely divided form and any other additives with the water-soluble matrix or binder in liquid form to prepare a slurry which can be cast into suitable molds and solidified. Preferably the flocculant unit contains from 20 to 70 weight percent anionic acrylamide polymer, the balance being primarily the binder or matrix together with a minor amount of detergent and any other desired additives.

Obviously the flocculant stick can if desired consist of one or more concentric sections having varying formulations and dissolving rates. Alternately it could be a solid water-soluble outer casing filled with a liquid solution of the anionic acrylamide polymer, the entire unit being handled as a solid unit in treating the gas well.

In treating a gas well to reduce or minimize sand blocking, the flocculant sticks or pellets are dropped down the well bore at desired intervals, or when the well head pressure drops below a practical level. Normally sufficient water to dissolve the flocculant sticks is present at the well-bottom. However, when necessary water can be added at the time of the treatment, or preferably just before the addition of the flocculant stick. Obviously to reactivate a well plugged by a sand bridge a composition which disperses rapidly when the accumulated sand bridge is reached is desired. For preventative treatment, a composition which dissolves slowly over a period of days to provide a gradual release of the active ingredients is advantageous.

With a sand blocked well, success of the treatment is generally indicated by expulsion within one to two hours of a slug of water and sand and a marked increase in the well head pressure. While sand normally obtained from a production gas well is very gritty, self-adherent and readily compacted into a dense mass, sand recovered after treatment with an anionic acrylamide polymer stick, is very fluffy and free flowing.

The outstanding advantage of the present invention is that it substitutes the very simple procedure of introducing a solid anionic acrylamide polymer composition in stick or pellet form for considerably more complex and involved mechanical operations which may require well shutdown of several days or more. Not only is the formation of sand bridges minimized, but the coproduced sand is smoothly transferred to the surface with a minimum formation of unexpected and dangerous sand slugs which overload the surface sand separators and damage the surface gas handling system.

The present invention is useful not only in reducing sand blocking, but also in continuously changing the physical character of the sand normally coproduced with the gas in many wells so that the sand is no longer self-adherent. A slow dissolving anionic acrylamide polymer composition provides for the gradual release of the active polymer to modify the produced sand so that it is readily swept from the well by the gas flow.

To illustrate further the present invention and its advantages, the following examples are given without limitations of the invention thereto. Unless otherwise specified, all parts and percentages are by weight.

Example 1.—Flocculant sticks

About 2700 parts of a solid waxy polyoxyethylene glycol having an average molecular weight of about 4500 and a pour point of 56° C. (Dow Polyglycol E–4000) was heated until molten. Then 1800 parts of a finely ground high molecular weight anionic acrylamide polymer prepared by hydrolyzing about 30 mole percent of the amide groups of an acrylamide homopolymer and 275 parts of sodium dodecylbenzene sulfonate was blended into the molten glycol. The homogeneous slurry was poured into preheated cylindrical molds about 2.5 cm. in diameter and 50 cm. in length and solidified by cooling. The resulting solid flocculant sticks were removed from the mold and sealed in a protective water resistant wrapping until use.

Example 2.—Field test (A) A production gas well was showing a well head pressure of 520 p.s.i. when a flocculant stick described in Example 1 was inserted through the lubricator into the well bore. An hour later a 40 gallon slug of water and sand was ejected with a big surge of gas. The well head pressure increased to 620 p.s.i. Nine days later when the pressure had dropped again to 520 p.s.i. the treatment was repeated and the pressure restored to 600 p.s.i. within two hours. A third treatment 15 days later increased the well head pressure from 430 p.s.i. to 560 p.s.i. in one hour.

(B) At another well in the same locality, the well head pressure was increased from 220 p.s.i. to 325 p.s.i. one hour after a flocculant stick was introduced. In this instance the operator noted expulsion of a 30 gallon slug of water including "a lot" of sand. Equally satisfactory results were obtained in a subsequent retreatment of this well.

(C) Another well released 40 gallons of sand and water with a pressure rise from 430 to 500 p.s.i.'s when treated with one of the flocculant sticks. A second treatment 17 days later unloaded 30 gallons of water in 2 hours and raised the well-head pressure from 200 to 425 p.s.i.

In the above tests, the flocculant sticks were added not at regular preset intervals, but only when the gas pressure at the well head became excessively low. While these tests do not conclusively show the prevention or elimination of sand bridging, they do demonstrate that the anionic acrylamide polymer composition effectively increases the removal of sand and water from the well bore.

*Example 3*

Another production gas well which had not responded to several treatments with detergent sticks was treated with a solid flocculant stick prepared by freezing a 20–30 weight percent aqueous solution of anionic acrylamide polymer in a section of hose. In this case the anionic acrylamide polymer was about 10% hydrolyzed, high molecular weight polyacrylamide. The frozen flocculant stick was inserted through the lubricator and the well shut down for about 24 hours. Production was then resumed and observed to be "much better." It was the opinion of the operator and his supervisor, an experienced production engineer, that a sand bridge had been eliminated.

*Example 4*

A mixture of 70 parts of a 30 percent hydrolyzed high molecular weight polyacrylamide and 105 parts of the Polyglycol E–4000 described in Example 1 was formed into a stick about 2.1 cm. in diameter and 25 cm. long. The stick was added to a commercial gas well and the properties of the sand carried to the surface thereafter examined. It was found that the nature of the produced sand was modified for about 10 days following the addition of the solid flocculant stick.

*Example 5.—Laboratory test*

To demonstrate the effect of the anionic acrylamide polymer on the well-bottom sand, the following laboratory test was made using sand recovered from an untreated commercial gas well. This recovered sand is very gritty and has a steep angle of repose. Microscopic examination reveals that the individual grains are angular and only very roughly spherical in shape.

Into each of four 500 ml. graduates was placed 500 ml. of this well-bottom sand and 250 ml. of an aqueous solution containing 100 p.p.m. $CaCl_2$ and 500 p.p.m. $Na_2SO_4$ to simulate well water. Then the graduates were vigorously shaken to form a sand slurry. Sufficient 1 percent aqueous solution of anionic acrylamide polymer (30 percent hydrolyzed polyacrylamide) was added to two of the slurries to give a solution concentration of 8 p.p.m. polymer. After a final shaking to disperse the polymer, the graduates were all allowed to stand undisturbed at room temperature.

After standing 41 days the volume of compacted sand at the bottom of each graduate was recorded. Then each graduate was carefully inverted once or more until the sand was completely resuspended. The number of inversions required is an indication of the self-adhesion of the sand.

The results are given below in Table 1.

TABLE 1

| Test | Added Polymer | Compacted Sand Layer | | Inversion Required |
|---|---|---|---|---|
| | | Volume, ml. | Appearance | |
| 1 | None | 44 | Clay layer on top of sand. | 10 |
| 2 | do | 54 | do | 11 |
| 3 | 8 p.p.m | 62 | Uniform | ᵃ 2 |
| 4 | 8 p.p.m | 66 | do | 1 |

ᵃ About 95 percent redispersed by 1 inversion.

Obviously the anionic acrylamide polymer markedly alters the properties of the well-bottom sand. While the untreated sand is gritty and settles as a dense layer which redisperses only slowly, the treated sand is fluffy and free-flowing. The appearance of clay hands on top of the untreated sand layer suggests that clay may be a binder for the accumulated well-bottom sand. The anionic acrylamide polymer treatment eliminates a separate, visible clay layer in the above test.

I claim:

1. A process for stimulating a gas well which comprises adding to the well as a solid unit a water-soluble composition comprising from 20 to 70 weight percent of a water-soluble, high molecular weight anionic acrylamide polymer in a water-soluble matrix, thereby modifying the properties of the well-bottom sand and reducing its interference with the gas flow.

2. The process of claim 1 wherein the water-soluble composition consists essentially of from 20 to 70 weight percent of the water-soluble anionic acrylamide polymer, up to 10 weight percent of an anionic detergent, and a solid, water-soluble polymeric matrix.

3. The process of claim 2 wherein the anionic acrylamide polymer is a high molecular weight polyacrylamide with from 10 to 40 mole percent of the amide groups hydrolyzed to the corresponding carboxylic groups.

4. The process of claim 3 wherein the anionic detergent is a sodium alkylbenzene sulfonate.

5. The process of claim 3 wherein the binder is a solid, water-soluble polyoxyethylene glycol.

6. The process of claim 1 wherein the solid unit is a frozen aqueous solution of the high molecular weight anionic acrylamide polymer.

7. A water-soluble composition useful for stimulating a gas well consisting essentially of (a) from 20 to 70 percent of a water-soluble high molecular weight anionic acrylamide polymer, (b) from 2 to 10 weight percent of an alkylbenzene sulfonate, and (c) from 20 to 78 weight percent of a solid, water-soluble polyoxyethylene glycol.

8. The water-soluble composition of claim 7 wherein the anionic acrylamide polymer is a polyacrylamide with from 10 to 40 mole percent of the amide group hydrolyzed to the corresponding carboxylic group.

References Cited by the Examiner

UNITED STATES PATENTS

| | | | |
|---|---|---|---|
| 2,748,867 | 6/1956 | Lissant | 166—45 |
| 3,073,387 | 1/1963 | Dunning | 166—45 |
| 3,155,178 | 11/1964 | Kirkpatrick | 166—44 X |
| 3,219,115 | 11/1965 | Hower et al. | 166—45 |
| 3,251,417 | 5/1966 | Holman | 166—45 |

References Cited by the Applicant

UNITED STATES PATENTS

| | | |
|---|---|---|
| 2,775,557 | 12/1956 | Morgan. |
| 3,076,508 | 2/1963 | Lissant. |
| 3,122,203 | 2/1964 | Hawkins. |

FOREIGN PATENTS 522,850  3/1956  Canada.

JACOB L. NACKENOFF, *Primary Examiner.*

CHARLES E. O'CONNELL, *Examiner.*

N. C. BYERS, *Assistant Examiner.*

UNITED STATES PATENT OFFICE
CERTIFICATE OF CORRECTION

Patent No. 3,305,019                                    February 21, 1967

Melvin F. Katzer

It is hereby certified that error appears in the above numbered patent requiring correction and that the said Letters Patent should read as corrected below.

Column 2, lines 10 and 11, strike out "(b) from 2 to 10 weight percent acrylamide" and insert instead -- such as a partially hydrolyzed polyacrylamide --; column 6, line 35, after "70" insert -- weight --.

Signed and sealed this 28th day of November 1967.

(SEAL)
Attest:

Edward M. Fletcher, Jr.                                      EDWARD J. BRENNER
Attesting Officer                                               Commissioner of Patents